(12) United States Patent
Boyd et al.

(10) Patent No.: US 10,540,505 B2
(45) Date of Patent: Jan. 21, 2020

(54) TECHNOLOGIES FOR PROTECTING DATA IN AN ASYMMETRIC STORAGE VOLUME

(71) Applicant: INTEL CORPORATION, Santa Clara, CA (US)

(72) Inventors: James A. Boyd, Hillsboro, OR (US); Dale J. Juenemann, North Plains, OR (US); Robert J. Royer, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 15/721,554

(22) Filed: Sep. 29, 2017

(65) Prior Publication Data

US 2019/0102565 A1    Apr. 4, 2019

(51) Int. Cl.
*G06F 11/30* (2006.01)
*G06F 21/60* (2013.01)
*G06F 3/06* (2006.01)
*G06F 16/27* (2019.01)

(52) U.S. Cl.
CPC .......... *G06F 21/602* (2013.01); *G06F 3/0623* (2013.01); *G06F 16/273* (2019.01); *G06F 3/065* (2013.01); *G06F 3/067* (2013.01)

(58) Field of Classification Search
USPC ....................................................... 713/193
See application file for complete search history.

(56) References Cited

U.S. PATENT DOCUMENTS

| | | | | |
|---|---|---|---|---|
| 8,266,449 B2* | 9/2012 | Challener | ............. | H04L 9/3226 711/114 |
| 8,732,485 B2* | 5/2014 | Kahler | ................ | G06F 11/1076 380/277 |
| 9,043,613 B2* | 5/2015 | Shapiro | ............... | G06F 12/1408 713/190 |
| 9,342,466 B2* | 5/2016 | Shapiro | ............... | G06F 12/1408 |
| 9,594,698 B2* | 3/2017 | Koning | ............... | G06F 12/1408 |
| 9,804,801 B2* | 10/2017 | Moon | .................... | G06F 3/0611 |
| 2015/0293858 A1* | 10/2015 | Raam | .................... | G06F 21/606 713/193 |

* cited by examiner

*Primary Examiner* — Amare F Tabor
(74) *Attorney, Agent, or Firm* — Grossman, Tucker, Perreault & Pfleger, PLLC (57) ABSTRACT

Technologies for protecting data in an asymmetric volume (ASV) that includes a first storage device that supports device-based encryption and a second storage device that does not support device-based encryption. In embodiments the technologies enable disparate capabilities of the storage devices in an ASV to be exposed to a user. When a complete copy of targeted data identified by a user input for encrypted storage is not present on the first storage device, at least a portion of the targeted data stored on the second storage device is rewritten to the first storage device. When a complete copy of the targeted data is stored on the first storage device, one or more security operations are performed to obfuscate or erase any portion of the targeted data stored on the second storage device.

26 Claims, 3 Drawing Sheets

TECHNOLOGIES FOR PROTECTING DATA IN AN ASYMMETRIC STORAGE VOLUME

TECHNICAL FIELD

The present disclosure relates to technologies for protecting data in an asymmetric storage volume. In particular, the present disclosure relates to technologies for protecting data in an asymmetric storage volume that includes an aggregation of at least one storage device that supports device-based encryption, and at least one storage device that does not support device-based encryption.

BACKGROUND

With the advancement of the Internet, social media, streaming video, e-commerce, etc., the demand for large quantities of reliable electronic storage has increased dramatically. To meet that demand research has led to the development of high capacity electronic storage devices such as magnetic hard drives, solid state drives (SSDs), phase change media, high capacity tape media, and the like. Such devices are often capable of storing many tens, hundreds, or even thousands of gigabytes of data, with reliability ratings ranging from one to several years.

Although modern storage devices are relatively fast and reliable, there is often a desire at the consumer, business, or data center level to improve storage performance, and/or to insure against data loss due to storage device failure. Such goals may be accomplished by aggregating a plurality of storage devices into a single logical volume (also referred to herein as an "array"). For example, two or more storage devices may be aggregated using Redundant Array of Independent Disks (RAID), which is a data storage virtualization technology that combines multiple physical disk drives into a single logical volume. Various RAID configurations are known. For example, two or more storage devices may be aggregated in a RAID 1 configuration for data redundancy or in a RAID 0 configuration for improved performance. Other mechanisms for aggregating multiple storage devices are also known, such as JBOD (just a bunch of disks/drives), concatenation (or spanning), MAID (massive array of idle drives), caching, and the like.

In many cases two or more identical storage devices are aggregated to form an array. In some instances, however, it may be desirable to establish an array (using RAID or some other mechanism) by aggregating two or more storage devices that differ from one another. With RAID and other configurations, software and/or hardware that is used to configure and/or manage the array may only expose features to the user that are supported by all storage devices in the array. Put in other terms, the hardware/software will only expose a subset, or lowest common denominator, of user visible features that are supported by all storage devices in the array. Features which are not commonly supported by all of the storage devices in the array may be limited or unavailable for use, which may be undesirable in some instances.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

While the present disclosure is described herein with reference to illustrative embodiments for particular applications, it should be understood that such embodiments are exemplary only and that the invention as defined by the appended claims is not limited thereto. Those skilled in the relevant art(s) with access to the teachings provided herein will recognize additional modifications, applications, and embodiments within the scope of this disclosure, and additional fields in which embodiments of the present disclosure would be of utility.

The terms "asymmetric storage volume" and "ASV" are interchangeably used herein to refer to an array of storage devices that are configured as a single logical volume (e.g. using RAID, concatenation (e.g. JBOD), a caching configuration, or another aggregation technique), wherein the array includes a storage device that supports at least one feature that is not supported by at least one other storage device in the array. In embodiments, the ASV's described herein include at least a first storage device that supports device-based encryption (e.g., a self-encrypting drive), and a second storage device that does not support device-based encryption.

As used herein, the term "embodiment" refers to an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. Elements or aspects from one embodiment can be combined with elements or aspects of another embodiment.

As used herein, the term "module" refers to software, firmware, circuitry, and/or combinations thereof that is/are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, data machine circuitry, software and/or firmware that stores instructions executed by programmable circuitry. The modules may, collectively or individually, be embodied as circuitry that forms a part of one or more electronic devices, as defined previously. In some embodiments, one or more of the modules described herein may be in the form of logic that is implemented at least in part in hardware to perform data protection or other operations consistent with the present disclosure.

The term "storage device" is used herein to refer to any of the wide variety of devices that may be used to store data persistently.

The terms "SSD," "SSDs" and "solid state drive" are interchangeably used herein to refer to any of the wide variety of data storage devices in which integrated circuit assemblies (e.g., non-volatile random access memory (RAM) assemblies) are used to store data persistently. Such terms also encompass so-called "hybrid" drives, in which a solid state drive may be used (e.g., as cache) in combination with a hard disk drive, e.g., which includes a magnetic recording medium. In any case, an SSD may be understood to include non-volatile memory such as but not limited to flash memory such as negated and not and (NAND) and/or not or (NOR) memory, phase change memory (PCM), three dimensional cross point memory, resistive memory, nanowire memory, ferro-electric transistor random access memory (FeTRAM), magnetoresistive random access memory (MRAM) memory that incorporates memristor technology, spin transfer torque (STT)-MRAM, combinations thereof, and the like.

The present disclosure describes various embodiments in which one or more storage devices "support" or do not support certain features, such as device-based data encryption. In the context of device-based data encryption, the term "support" is used to indicate that a storage device includes hardware (e.g., circuitry) or firmware that enables performance of the indicated feature by the storage device itself. For example, storage devices that "support" device-based encryption may include a hardware and/or firmware based controller that includes an encryption/decryption engine that is capable of performing encryption/decryption operations on data independently of components that are external to the storage device (e.g., independent of a general purpose processor or other components of a system in which the storage device is installed). Such operations may include data at rest encryption/decryption, and/or the encryption/decryption of data as part of the storage device's normal read/write flow.

For example, some SSD's include a hardware encryption/decryption engine (as part of or separate from an SSD controller) that is configured to encrypt/decrypt data stored on the SSD with one or more encryption algorithms, such as but not limited to the Advanced Encryption Standard (AES) algorithm specified in FIPS Publication 197 and/or ISO/IEC 18033-3. With existing technology, the hardware encryption/decryption engines of an SSD may perform encryption/decryption of data many times faster than such encryption/decryption could be performed in host software (e.g., executed by a general purpose processor of a client or server). Examples of SSD's and other storage devices that include such functionality include self-encrypting drives, (SED's) and drives that implement full disk encryption (FDE). In contrast, storage devices that do not support device-based encryption may lack such a controller and/or may otherwise lack the ability to perform data encryption/decryption operations independent of one or more components external to the storage device. Magnetic hard drives are one non-limiting example of a storage device that does not support device-based encryption.

For the sake of ease of reference the present disclosure makes reference to various features using numerical designators such as "first," "second," and the like. In the context of storage devices, it should be understood that the terms "first" and "second" are used to denote one or more than one storage device that supports the same features. Thus in embodiments where a first and second storage device is mentioned, it should be understood that the "first" storage device may be one or more than one storage device that support common features (e.g., device-based encryption). Likewise, the "second" storage device should also be understood as including one or more than one storage device that support common features, but which do not support one or more features of the first storage device (e.g., device-based encryption).

As explained in the background, two or more storage devices may be aggregated into a single logical unit (i.e., an array), using RAID, concatenation, a caching configuration, or another technique. The array may be configured to support one or a variety of end user goals. Using RAID as an example, an array may be configured to support improved performance via data striping, redundancy via data mirroring, or a combination thereof. In a RAID 0 array, for example, logically sequential data is segmented and stored across multiple storage devices in the array. Because the storage devices in a RAID 0 array can be accessed concurrently, total data throughput (and in particular read performance) may be enhanced. In contrast, in a RAID 1 array data is identically written to all storage devices in the array. Although data throughput may be reduced in a RAID 1 array, the array will continue to operate as long as at least one storage device in the array is operational. For that reason RAID 1 arrays are often used to insure against data loss due to storage device failure. Other aggregations of storage devices (e.g., RAID 2, 3, 4, 5, 6, 10, JBOD, MAID, caching, etc.) are also known.

Although identical storage devices are often used to create (symmetric) arrays of storage devices, it is also possible to create an array (i.e., an asymmetric storage volume) that includes two or more different storage devices. For example, RAID and other techniques (caching, concatenation, etc.) may be used to form an asymmetric storage volume that includes a combination of different storage devices, such as at least two different HDDs, at least two different SSDs, a combination of one or more HDDs with one or more SDDs, and the like, wherein all of the storage devices do not support the same features. As explained in the background, prior known mechanisms for establishing and managing an array will only expose the subset or lowest common denominator of any user visible features that are commonly supported by all storage devices in an asymmetrical storage volume. As a result, features that are only supported by some of the storage devices in an ASV may be limited or unavailable for use with existing technology.

By way of example, an ASV may include a first storage device that supports device-based encryption, and a second storage device that does not support device-based encryption. Previous known controllers, software, etc. for establishing and/or managing such an ASV may expose the ASV to a user as not supporting device-based encryption, even though the first storage device supports that feature. As a result, when data is written to the ASV using existing techniques, at least a portion of the data may be placed on both the first storage device (which supports device-based encryption), and on the second storage device (which does not support device-based encryption). Even if the first storage device is a self-encrypting drive that encrypts all incoming data, there is no guarantee with existing technology that a complete copy of the data will be stored only to the first storage device. Rather, there is a risk that at least a portion of the data will be stored on the second storage device as plaintext unless steps are taken to encrypt the data (e.g., by a host software executed by a general purpose processor) prior to the data being written. This may be undesirable in some instances, such as when a user wishes for all of the data to be encrypted.

With the foregoing in mind, the present disclosure generally relates to technologies for protecting data in an asymmetric storage volume. In embodiments, the technologies include a system that includes a storage control module (SCM) and an asymmetrical storage volume (ASV). The ASV includes at least a first storage device that supports device-based data encryption (e.g., a self-encrypting drive) and a second storage device that does not support device-based data encryption. In response to a user input targeting data stored on the asymmetric storage volume for encryption, the SCM is configured, when a complete copy of the targeted data is not on the first storage device, to cause at least a portion of the targeted data that is stored on the second storage device (e.g., as plaintext) to be rewritten to the first storage device (e.g., as cipher text). When a complete copy of the targeted data is stored to the first storage device, the SCM may cause the execution of at least one security operation to obfuscate or erase the targeted data that is stored to the second storage device.

In further embodiments the ASV includes a first storage device that is a self-encrypting drive and a second storage device that does not support device-based encryption, and is configured to implement data striping, caching, and/or concatenation. In such instances the ASV may be configured as a single logical volume that includes a first set of logical block addresses (LBAs) that span the entire logical volume. The SCM is configured to comprehend the asymmetrical nature of the storage devices in the ASV and, based on that comprehension, to determine whether a complete copy of data targeted by a user input is present on a storage device that supports encryption. For example, the SCM may be configured to identify subsets of LBAs that are associated only with a first storage device that supports encryption and LBAs that are associated only with a second storage device that does not support encryption. For example, the ASV may be configured as a single logical volume that includes a first set of LBAs ranging from A-Z, where LBAs A-N are LBAs associated only with the first storage device, and LBAs O-Z are associated with the second storage device. In such instances the SCM may be configured to identify a first subset of LBAs in the single logical volume that is associated only with the first storage device (i.e., LBAs A-N), and a second subset of LBA's that is associated with the second storage device.

During normal operation, data writes to the ASV may cause data to be written across all storage devices in the ASV and, thus, within the first and second subsets of LBAs. Data written to the second subset of LBAs may be stored as plain text. In response to a user input targeting data stored to the ASV for encryption, the SCM may determine whether a complete copy of the targeted data is stored on the first storage device, e.g., by comparing the target of the user input with the location of the targeted data on the ASV.

When a complete copy of the targeted data is not on the first storage device, the SCM may cause at least a portion of the targeted data stored only in the second subset of LBAs (associated with the second storage device) to be rewritten to LBAs within the first subset of LBAs, (associated with the first storage device). In some embodiments, when the SCM determines that a complete copy of the targeted data is not stored in the first storage device, it causes only the portion of the targeted data that is stored in the second storage device (i.e., within the second subset of LBAs) to be rewritten to the first subset of LBAs. In other embodiments when the SCM determines that a complete copy of the targeted data is not stored in the first storage device, it causes all of the targeted data in the ASV (including targeted data on the first and second storage devices) is read and rewritten to the first storage device.

In any case when the first storage device supports device-based encryption, any data that is written to it is encrypted using encryption technology that is native to the first storage device. For example in instances where the first storage device is a self-encrypting drive, all data written to the first storage device may be encrypted by a hardware accelerated encryption/decryption engine that is local to the first storage device (e.g., which is part of a storage controller that is integral with the first storage device). When a complete copy of the targeted data is stored on the first storage device, the SCM may cause the execution of at least one security operation to obfuscate or erase the targeted data that is stored to the second storage device.

In still further embodiments the ASV includes a first storage device that is a self-encrypting drive and a second storage device that does not support device-based encryption, and is configured to implement data mirroring between the first and second storage devices. The SCM is configured to comprehend the asymmetrical nature of the storage devices in the ASV and, based on that comprehension, to identify a first subset of LBAs that are associated only with the first storage device and a second subset of LBAs that are associated only with the second storage device. Data writes executed during normal operation may write data to the first storage device as cipher text, while the same data is written to the second storage device as plain text. In response to a user input targeting data stored to the ASV for encryption, the SCM may be configured to determine whether data mirroring is employed by the ASV.

When the SCV determines that data mirroring is employed, the SCV may be configured to cause the execution of at least one security command to obfuscate or erase the targeted data that is stored to the second storage device. In such instance, rewriting or movement of the targeted data stored to the first storage device is not needed, as the targeted data is already written to the first storage device as cipher text. Put in other terms, in the data mirroring context the SCM may determine or otherwise have knowledge that ASM is configured to implement data mirroring and, therefore, will understand that a complete copy of the targeted data will be stored in all storage devices in the array (including the first storage device) due to normal operation of the ASV. In such instances and as discussed above, rewriting of data from the second storage device to the first storage device is unnecessary Methods for protecting data in an ASV and computer readable media including instructions that when executed cause the performance of operations for protecting data in an ASV are also disclosed herein.

One aspect of the present disclosure therefore relates to systems for protecting data in an asymmetric volume. For the sake of clarity and ease of understanding, the present disclosure will proceed to describe various embodiments in which a system is used to protect data in an asymmetric volume that is formed by aggregating a first storage device that supports device-based encryption (e.g., a self-encrypting drive) with a second storage device that does not support device-based encryption. The present disclosure also focuses on embodiments in which an ASV is formed in a RAID 0 or RAID 1 configuration. It should be understood that such embodiments are for the sake of example, and that the technologies described herein are not limited thereto. Indeed, the technologies described herein can be used to protect and/or manage data in any type of asymmetric volume, such as an ASV that includes two or more storage devices that are concatenated, in a caching configuration, configured to implement data striping (with or without parity), and/or configured to implement data mirroring (with or without data striping).

Figure 1:
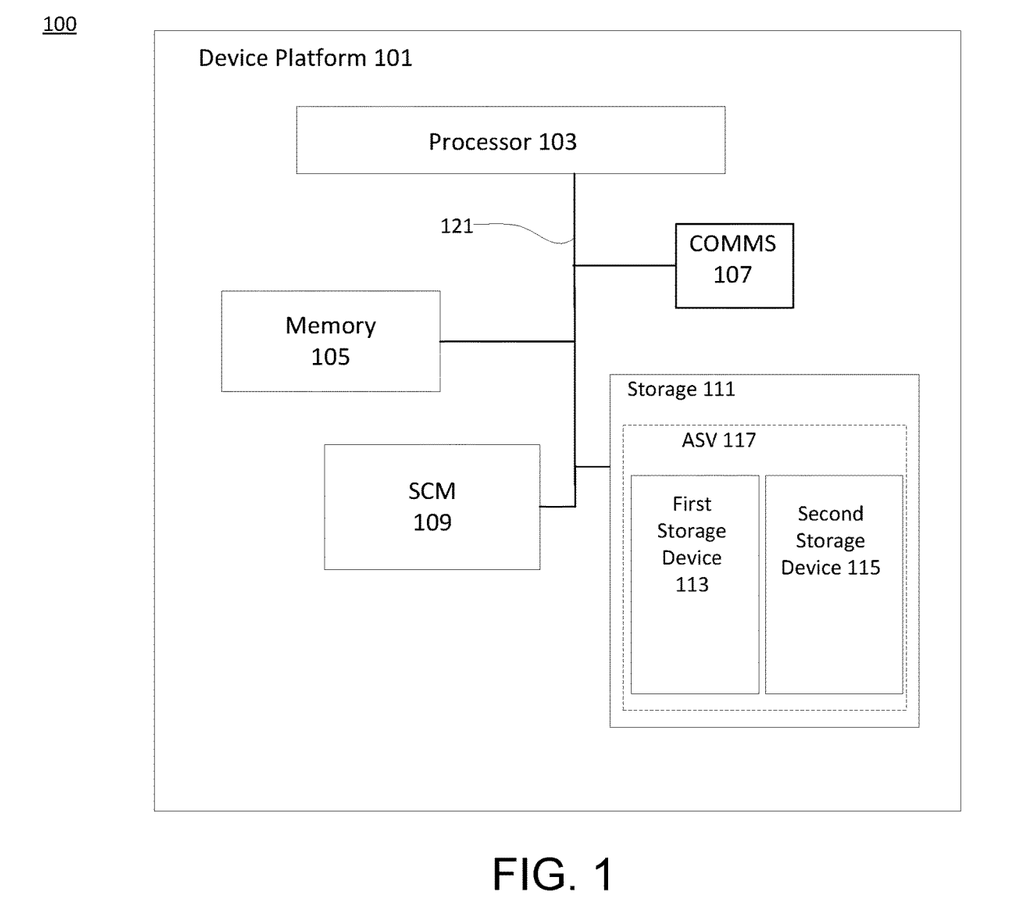
FIG. 1 is a block level diagram of one example of a system for protecting data in an asymmetric storage volume, consistent with the present disclosure.

With the foregoing in mind, FIG. 1 is a block diagram of one example of a system consistent with the present disclosure. As shown, system 100 includes device platform 101, processor 103, memory 105, communications resources (COMMS) 107, storage controller module (SCM) 109, and storage 111. Storage 111 includes at least first storage device 113 and second storage device 115, which are aggregated into an asymmetric volume (ASV) 117. The various components are communicatively coupled to one another via bus 121, which may be any suitable bus.

As can be seen, FIG. 1 depicts an embodiment in which SCM 109 and storage 111 are coupled to device platform 101, such that they form an integral device with the remainder the components of system 100. It should be understood that such illustration is for the sake of example only, and that SCM 109 and/or storage 111 need not be integral with the other components of system 100. Indeed the present disclosure envisions other configurations of the disclosed system, wherein one or more of SCM 109 and storage 111 are integral with other components of system 100. For example, SCM 109 and/or storage 111 may be included in a device that is remote from system 100, and may be in wired or wireless communication with system 100. For example, in some embodiments storage 111 is included in a server or data center that is remote from device platform 101. In such instances, SCM 109 may be local to device platform 101, local to the server or data center, or remote from device platform 101 and the server/data center. In any case, operation of SCM 109 and storage 111 may be substantially the same, except that such components may communicate with other elements of device platform 101, e.g., via a wired or wireless network using a currently known or future developed wired or wireless communication protocol.

System 100 may include or be in the form of one or more devices. The terms "device," "devices," "electronic device" and "electronic devices" are interchangeably used herein to refer individually or collectively to any of the large number of electronic devices that may be used in accordance with the present disclosure. Non-limiting examples of such devices include cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), home theater computers, set-top boxes, smart phones, tablet personal computers, ultra-mobile personal computers, wired telephones, data center storage device, combinations thereof, and the like. Such devices may be portable or stationary. Without limitation, the devices described herein are preferably one or more portable or stationary computing devices, such as one or more desktop computers, laptop computers, servers, computer terminals, and the like.

Device platform 101 may be any suitable device platform. Without limitation it is preferred that device platform 101 correlate to the type of electronic device used as system 100. Thus for example where system 100 is a desktop computer, laptop computer, server, data center rack, smart phone, tablet, etc., device platform 101 in some embodiments is a desktop computer platform, laptop computer platform, server platform, data center rack platform, smart phone platform, tablet platform etc. respectively. Without limitation, in some embodiments system 100 is or includes a desktop computer, server, home theater computer, and/or data center storage, in which case device platform 101 is or includes a desktop computer platform, home theater computer platform, server platform, data center storage platform, and the like.

Processor 103 may be any suitable general purpose processor or application specific integrated circuit, and may be configured to execute one or multiple threads on one or multiple processor cores. Without limitation, in some embodiments processor 103 is a general purpose processor, such as but not limited to the general purposes processors commercially available from INTEL® Corp., ADVANCED MICRO DEVICES®, ARM®, NVIDIA®, APPLE®, and SAMSUNG®. While FIG. 1 illustrates the use of a single processor 101, it should be understood that multiple processors may also be used.

Memory 105 may be any suitable type of computer readable memory. Examples of memory types that may be used as memory 105 include but are not limited to: programmable memory, non-volatile memory, read only memory, electrically programmable memory, random access memory, flash memory (which may include, for example NAND or NOR type memory structures), magnetic disk memory, optical disk memory, phase change memory, memristor memory technology, spin torque transfer memory, combinations thereof, and the like. Additionally or alternatively, memory 105 may include other and/or later-developed types of computer-readable memory.

COMMS 107 may include hardware (i.e., circuitry), software, or a combination of hardware and software that is configured to allow system 100 to transmit and receive messages via wired and/or wireless communication. Communication between COMMS 107 and a remote device may occur, for example, over a wired or wireless connection using one or more currently known or future developed communication standards. COMMS 107 may include hardware to support such communication, e.g., one or more transponders, antennas, BLUETOOTH™ chips, personal area network chips, near field communication chips, wired and/or wireless network interface circuitry, combinations thereof, and the like.

Storage control module (SCM) 109 may be in the form of hardware, software, or a combination of hardware and software (e.g., firmware) that is configured to cause system 100 to perform storage control operations consistent with the present disclosure. In some embodiments, SCM 109 may be in the form of or include circuitry such as a storage controller (e.g., a host storage controller), which may be independent or included within a platform control hub of system 100 (not shown). When used, the host storage controller integral with or coupled to storage 111 in any suitable manner. For example, the host storage controller may be coupled to storage 111 via a serial ATA (SATA) or peripheral component interconnect express (PCIe) interface. The host storage controller may communicate with storage 111 in any suitable manner, such as via a previously developed of future version of the advanced host controller interface (AHCI) and/or non-volatile memory express (NVME) protocols.

Alternatively or additionally, SCM 109 may be in the form of or include a non-transitory computer readable medium that includes instructions which when executed cause the performance of storage control operations consistent with the present disclosure. For example, SCM 109 may be in the form of or include a storage control driver that includes instructions which, when executed, cause system 100 to perform storage control operations consistent with the present disclosure. In further embodiments, SCM 109 may be or include an AHCI driver for a SATA storage device (e.g., in storage 111) and/or a NVMHCI (non-volatile memory host controller interface specification) driver for a solid state storage device, such as an SSD or magnetic hard drive in storage 111.

Storage 111 includes a plurality of storage devices that are configured to persistently store data such as programs, drivers, an operating system, etc. For the sake of illustration, FIG. 1 depicts an embodiment in which storage 111 includes a first storage device 113 and a second storage device 115, wherein the first and second storage devices 113, 115 are arrayed into an asymmetric storage volume (ASV) 117. It should be understood that storage 111 is not limited to two storage devices, and that any suitable number of storage devices may be used. Moreover, ASV 117 may include storage devices other than first and second storage devices 113, 115. For example, multiple first storage devices 113 may be used with one or multiple second storage devices 115. Likewise, one or multiple second storage devices 115 may be used with one or multiple first storage devices 113.

First storage device 113 may be any suitable storage device. Non-limiting examples of suitable storage devices that may be used as first storage device 113 include magnetic disk memory such as hard disk drives (HDDs), flash memory (which may include, for example NAND or NOR type memory structures) such as solid state disks, optical disk memory, phase change memory, memristor memory technology, spin torque transfer memory, combinations thereof, and the like. Second storage device 115 may also be any suitable storage device and may be selected from those noted for storage device 113, provided that it is not identical to storage device 113.

That is, storage devices 113 and 115 may be any suitable storage device, provided that storage device 113 supports at least one feature that is not supported by storage device 115. In embodiments, storage device 113 is a storage device that supports device-based data encryption, whereas storage device 115 does not support device-based data encryption. Without limitation, in some embodiments first storage device 113 is a self-encrypting drive (SED) such as a self-encrypting SSD, a self-encrypting hard disk drive, a self-encrypting hybrid disk drive that includes an SSD that caches a magnetic hard drive, or the like, whereas storage device 115 does not have native encryption capabilities. In specific non-limiting embodiments, first storage device 113 is self-encrypting solid state disk sold by INTEL® corporation, e.g., in a 2.5 inch, 3.5 inch, M.2 or other form factor. In some embodiments, first storage device 113 is a self-encrypting drive sold by INTEL® Corporation under the OPTANE™ brand.

Consistent with the foregoing discussion, the first and second storage devices 113, 115 may also include a plurality of storage devices that support common features. Thus, for example, first storage device 113 may include a plurality of (e.g., 2, 3, 4, 5, 10, or more) storage devices that support common features. Likewise second storage device 115 may include a plurality (2, 3, 4, 5, 10, or more) storage devices that support common features, but which do not support at least one feature that is supported by the first storage device 113. In embodiments, first storage device 113 includes one or a plurality of (i.e., 2 or more) storage devices that support device-based encryption (e.g., a plurality of self-encrypting drives), and second storage device 115 includes one or a plurality of (i.e., two or more) storage devices that do not support device-based encryption.

In the embodiment of FIG. 1 ASV 117 is an aggregation of first storage device 113 and second storage device 115, and is configured as a single logical volume that includes a plurality of logical block addresses for storing data. The manner in which the first and second storage devices 113, 115 are aggregated is not limiting, and any suitable aggregation technique can be used. For example, first and second storage devices 113, 115 may be aggregated to form ASV 117 using RAID, concatenation (e.g., JBOD), a caching configuration, or another technique as noted above. In instances where ASV 117 is a RAID array, it may be configured in any RAID level, such as but not limited to RAID 0, RAID 1, RAID 2, RAID 3, RAID 4, RAID 5, RAID 6, RAID 10, or other RAID level, as desired. In instances where ASV 117 is a concatenation of storage devices, that concatenation may be established using any suitable technique, such as JBOD or MAID. When the ASV 117 is in a caching configuration, it may be configured such that the first storage device 113 caches the second storage device 115, e.g., for write-through or write-back caching. In a write-through caching arrangement, data is replicated on both storage devices (i.e., 113 and 115), and so the operations discussed herein with regard to a data mirroring configuration would apply. In a write-back arrangement, data may or may not be replicated on both storage devices (i.e., on both 113 and 115) depending on cache cleaning policies, and operations consistent with those described herein with regard to the use of an ASV in a data striping configuration would apply.

During normal operation, data writes targeting ASV 117 cause data to be written to ASV 117 in accordance with its array configuration. For example when ASV 117 is configured as a RAID 0 array, normal data writes targeting ASV 117 will cause segments of the data to be written or "striped" to both first storage device 113 and second storage device 115. Similarly when ASV 117 is a RAID 1 array, normal data writes targeting ASV 117 will cause data to be identically written to both the first storage device 113 and the second storage device 115. In instances where ASV is a concatenation of multiple drives, data may be written to any disk in the array, e.g., as determined by an array controller. More generally, normal data writes targeting ASV 117 may cause data to be stored to a first range of logical block addresses in ASV 117, wherein the first range spans both first storage device 113 and second storage device 115. In such instances at least some of the data will be written to both the first storage device 113 and second storage device 115. When first storage device 113 is a self-encrypting drive and second storage device 115 does not support device-based encryption, data writes targeting ASV 117 will cause data to be written to the first storage device 113 as cipher text, and data to be written to the second storage device 115 as plain text.

In embodiments SCM 109 is configured to discover (or otherwise have knowledge of) the disparate capabilities of the storage devices in ASV 117, and to expose the differing capabilities of those devices to a user of system 100. For example where first storage device 113 supports device-based encryption (e.g., is a self-encrypting drive) but second storage device 115 does not, ASV 117 may be presented to a user as a single storage volume that does not support encryption for the purpose of normal data storage operations. Nonetheless, SCM 109 may be configured to determine (or otherwise have knowledge of) the disparate capabilities of the storage devices in ASV 117. The SCM may accomplish that, for example, by querying the storage devices in ASV 117 for their self-reported capabilities. Moreover, SCM 109 may be configured to expose or cause the exposure of the varying capabilities of the storage devices in ASV 117 to a user, e.g., via a graphical user interface or other mechanism. Thus, for example, SCM 109 may be configured to expose the device-based encryption capabilities of first storage device 113 to a user, e.g., via a graphical user interface displayed on a display (not shown) of system 100. In that way, SCM 109 may inform a user of the device-based encryption support of first storage device 113, even though ASV 117 may be otherwise presented as a single logical volume that does not support encryption for normal data storage operations.

In embodiments SCM 109 is configured such that it can learn or has prior knowledge of the location of all data stored on ASV 117. SCM 109 may maintain or obtain such knowledge in any suitable manner. For example, SCM 109 may obtain knowledge of the location of data stored in ASV 117 via interaction with a file system of an operating system executed by processor 103 on system 100. Alternatively or additionally, SCM 109 may maintain or have knowledge of one or more data structures (e.g., a lookup table such as a logical to physical (L2P) table) that associates data with logical block addresses within ASV 117. SCM 109 may also be configured such that it can determine (or otherwise has knowledge of) which logical block addresses are associated with each storage device in ASV 117.

For example, ASV 117 may include logical block addresses A-Z, wherein a first subset of those logical block addresses (e.g., A-N) is associated only with first storage device 113, and a second subset of those logical block addresses (e.g., O-Z) is associated only with second storage device 115. In such instances, SCM 109 may be configured such that it can determine and/or has prior knowledge of which logical block addresses of ASV 117 are associated with each storage device in the array. In that way, SCM 109 may understand which logical block addresses are associated with storage devices in ASV 117 that support encryption (in this case, first storage device 113), and which logical block addresses are associated with storage devices in ASV 117 that do not support encryption (in this case, second storage device 115).

In embodiments SCM 109 is further configured to enable a user to select data stored on ASV 117 for secure storage, i.e., encryption. For example, SCM 109 may enable or cause the presentation of a graphical or other interface, through which a user of system 100 may select data stored on ASV 117 for secure storage/encryption.

SCM 109 is also configured to monitor for a user input that identifies targeted data stored on ASV 117 for encryption. In embodiments this is accomplished or facilitated by way of a setting in a user interface application, the use of one or more input/output control (IOCTL) calls, and/or an operating system exposed application programming interface. In response to such a user input, SCM 109 may be configured to perform or cause the performance of operations that result in the targeted data being stored only in the first storage device 113. Depending on how ASV 117 is configured, the manner in which SCM 109 may accomplish that goal may differ. In general, SCM 109 may determine (or have prior knowledge) of whether or not a complete copy of the targeted data is stored in the first storage device. If not, SCM 109 may cause at least a portion of the targeted data that is stored on other storage devices (e.g., second storage device 115) to be rewritten to the first storage device 113. When a complete copy of the targeted data is stored to the first storage device 113 (e.g., following rewriting of targeted data from the second storage device 115 or in instances where a complete copy is already stored to the first storage device 113), SCM 109 may execute or cause the execution of at least one security operation to obfuscate or delete any portion of the targeted data that is stored in the second storage device.

For example, in response to a user input that targets data stored on ASV 117 for encryption, SCM 109 may determine the manner in which ASV 109 is configured. For example where ASV 117 is a RAID array, SCM 109 may be configured to determine in which RAID level (e.g., RAID 0, RAID 1, RAID 5, RAID 10) ASM 117 is configured. When ASV 117 is a concatenation of multiple storage devices or is in a caching configuration, SCM 109 may determine which LBAs/pages are associated with specific storage devices in the array. Alternatively, SCM 109 may have prior knowledge of the configuration of ASV 117 (e.g., from establishment of the array), in which case operations to determine the configuration of ASV 117 may be omitted.

Once the configuration of ASV 117 is determined (or if SCM 109 has prior knowledge of that configuration), SCM 117 may be configured to identify where the targeted data is stored on the storage devices in ASV 117. More specifically, SCM 109 may identify what portion of the targeted data is stored to first storage device 113, and what (if any) portion of the targeted data is stored to second storage device 115. SCM 109 may accomplish this in any suitable manner. For example, SCM 109 may determine whether a portion of the targeted data is stored to the first and second storage devices 113, 115 by issuing or causing the issuance of a query command to the first and second storage devices, 113, 115, wherein the query command is configured to cause the first and second storage devices 113, 115 to report the physical location (e.g., logical block addresses) of the targeted data. Alternatively or additionally, SCM 109 may determine what portion of the targeted data is stored to the first and second storage devices 113, 115 by consulting a data structure (e.g., a logical to physical table) that maps data to physical locations (logical block addresses) of the first and second storage devices 113, 115, or the like.

SCM 109 may leverage its understanding of the configuration of the ASV 117 to learn where the targeted data is stored. For example when SCM 109 determines or has prior knowledge that ASV 117 is configured to implement data mirroring, it will likewise understand that a complete copy of all data written to ASV 117 is present on each storage device in the array. Likewise when SCM 109 determines or has prior knowledge that ASV 117 is configured to implement data striping (without mirroring), it will also understand that data written to ASV 117 will be distributed across all storage devices in the array, and that a complete copy of any file or other data structure will not be present on any single storage device in the array. In that way, SCM 109 may quickly determine whether a complete copy of the targeted data is present on first storage device 113.

In some embodiments, ASV 117 may be configured as a single logical volume that includes a first plurality of logical block addresses (LBAs) that span the first and second storage devices 113, 115. In such instances, SCM 109 may have knowledge of or may be configured to determine sub-ranges of the first plurality of LBAs that are associated only with one of the storage devices in ASV 117. For example, SCM 109 may have knowledge of or be configured to determine a first sub-sub range of the first plurality of LBAs that are associated only with first storage device 113, and a second sub-range of the first plurality of LBAs that are associated only with second storage device 115. Because SCM 109 also has knowledge of the differing capabilities of the first and second storage devices 113, 115, it may use that knowledge to determine which logical block addresses are associated with the differing capabilities of the first and second storage devices 113, 115. SCM 109 may also be configured to use its knowledge of the LBA ranges corresponding to each storage device to determine where on ASM 117 the data targeted by the user input is stored.

More specifically, in embodiments the user input may include or cause the issuance of a command that identifies targeted data stored on ASV 117 for encryption. In response, SCM 109 may determine where the targeted data is presently stored on ASV 117, e.g., from ASV's configuration and/or by looking up LBAs for the data targeted by the command (e.g., in a L2P table) and identifying the storage device(s) in ASV 117 that are associated with those LBAs.

Once SCM 109 has knowledge of the location of the targeted data, it may determine whether any portion of the targeted data needs to be relocated to the first storage device. That is, SCM 109 may determine whether a complete copy of the targeted data is presently stored to the first storage device 113. The outcome of that determination may depend on the manner in which ASV 117 is configured, as noted above and discussed in more detail below.

In instances where ASV 117 is configured to implement data striping without mirroring or redundancy (e.g., as a RAID 0 or similar array), all data written to ASV 117 during normal operations will be written across first and second storage devices 117. SCM 109 will, therefore, understand that at least a portion of the targeted data will be located only on the second storage device 115. In such instances, SCM 109 may be further configured to cause any portion of the targeted data that is stored to the second storage device 115 to be rewritten to the first storage device 113. Because the first storage device is a self-encrypting drive, any targeted data that is rewritten from the second storage device 115 to the first storage device 113 will be encrypted, resulting in a complete copy of the targeted data on the first storage device.

In instances where ASV 117 is configured to implement data mirroring (e.g., as RAID 1 or similar array), a copy of all data written to ASV 117 during normal operations will be written to both the first storage device 113 and the second storage device 115. SCM 109 will, therefore, understand that a complete copy of all data written to ASV 117 will be present on each drive in the array. More specifically, in instances where the first storage device 113 is a self-encrypting drive, SCM 109 will understand that a complete and encrypted copy of the targeted data will be present on the first storage device 113, and that a complete (and unencrypted) copy of the targeted data will be present on the second storage device 115 (which does not support encryption). In such instances, SCM 109 may determine that because ASV 117 is configured to implement data mirroring, relocation of targeted data from the second storage device to the first storage device 113 is unnecessary.

In instances where ASV 117 is a concatenation of multiple storage devices (e.g., via JBOD, for a caching configuration, or the like), data written to ASV 117 during normal operations may be written to both the first storage device 113 and the second storage device 115. The location to which the data is written during normal operation of the array may vary, and may be under the control of the controller managing the array. In such instances SCM 109 may be configured to determine where the targeted data is stored on the array, as there is no guarantee that data writes during normal operation will result in data being placed only on the first storage device 113 (i.e., a storage device that supports device-based encryption). When SCM 109 determines that a complete copy of the targeted data is not stored on the first storage device 113, it will cause any portion of the targeted data that is not stored to the first storage device 113 (i.e., which is stored in the second storage device 115) to be rewritten to the first storage device 113. Because the first storage device 113 is a self-encrypting drive, targeted data that is rewritten from the second storage device 115 to the first storage device 113 will be encrypted, resulting in complete copy of the targeted data on the first storage device.

Once a complete copy of the targeted data is present on a storage device that supports device-based encryption (e.g., following the rewriting of targeted data or if rewriting is not necessary), SCM 109 may be configured or cause the execution of at least one security operation to obfuscate and/or erase any portion of the targeted data that is stored on a storage device in ASV 117 that does not support encryption. For example, when a complete copy of the targeted data is stored to the first storage device 113 as cipher text, SCM 109 may be configured to obfuscate or erase any portion of the targeted data on the second storage device 115.

In some embodiments the at least one security operation may include obfuscating the portion of the targeted data on the second storage device 115. The term "obfuscate" is used herein to mean that one or more steps are taken to obscure, hide, or otherwise make data inaccessible. In embodiments, a security operation may obfuscate targeted data by updating the file system or one or more data structures (e.g., a logical to physical table) to change the logical block addresses, pages or other location indicia that are associated with the targeted data. For example, a file system or data structure may associate at least a portion of targeted data with first LBAs/pages on the second storage device 115. When a complete copy of the targeted data is present on the first storage device 113 (e.g., after the portion stored to the second storage device 115 is rewritten to the first storage device or if rewriting is not needed), SCM 109 may execute at least one security operation that changes the first LBAs/pages associated with the targeted data on the second storage device 115 to second, different LBAs/pages. Subsequently, a read command targeting the portion of the targeted data on the second storage device 115 will cause data other than the targeted data on the second storage device to be read.

Alternatively or additionally, the at least one security operation may include erasing the portion of the targeted data on the second storage device 115. For example, SCM 109 may execute or cause the execution of a trim command that erases the logical block addresses of the second storage device 115 that are associated with the targeted data. The trim command may, for example, indicate to the second storage device 115 that the pages/LBAs containing targeted data are no longer in use—thus allowing those pages/LBAs to be overwritten by the second storage device. To improve security or for other purposes, the security operations may also include causing the second storage device 115 to overwrite the pages/LBAs that contain(ed) targeted data with other data. For example, in some embodiments SCM 109 may, concurrent with or after execution of a trim command, execute or cause the issuance of an overwrite command that causes the second storage device 115 to overwrite the pages/LBAs of the second storage device that contain(ed) targeted data with zeros or other data. In embodiments where a storage device that does not support device-based encryption also does not support trim, the pages/LBAs that contain(ed) targeted data may be overwritten with other data, without execution of a trim command.

SCM 109 may also be configured to cause targeted data stored to one or more storage devices in an asymmetric volume to be maintained in a particular location. For example and continuing with the embodiment of FIG. 1, when a complete copy of the targeted data is stored to the first storage device 113, SCM 109 may execute or cause the execution of operations that cause the first storage device 113 to maintain the targeted data on the first storage device 113 until the targeted data is released for deletion and/or relocation. For ease of reference, such operations are referred to herein as "pinning." SCM 109 may pin targeted data to the first storage device 113 in any suitable manner. For example, SCM 109 may pin targeted data 113 by enabling a pin flag in an file system of system 100 (or an operating system executed thereon), and/or by enabling a pin flag in a data structure below the file system, such as but not limited to a logical to physical table. The pin flag may be a single or multi-bit indicator that forces maintenance of the targeted data associated with the pin on the first storage device 113. In embodiments the pin flag may require maintenance of the targeted data on the first storage device 113 at its current location (i.e., at its current set of LBAs) until the pin flag is released/unset. Alternatively, the pin flag may permit targeted data associated to be relocated among LBAs on the first storage device 113, but may prevent movement of the targeted data off the first storage device 113 until the pin flag is released/unset. The latter configuration may facilitate wear leveling and other end goals, which may be particularly desirable in instances where the first storage device is a solid state drive.

Another aspect of the present disclosure relates to methods for protecting data in an asymmetric volume (ASV). In that regard reference is made to FIG. 2, which is a flow diagram of example operations of one embodiment of a method of protecting data in an ASV consistent with the present disclosure. For the sake of illustration, the operations of method 200 will be described with reference to FIG. 3, which is a high level block diagram showing the movement of data within an ASV at various points.

Figure 3A:
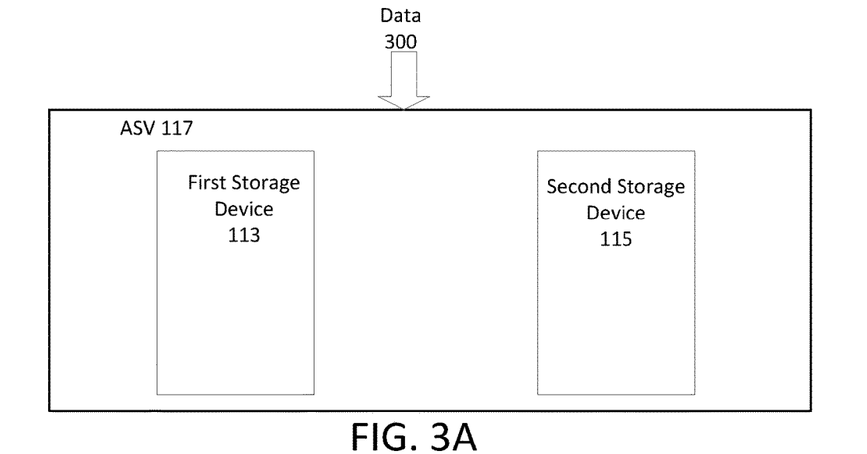
FIGS. 3A-3C are high level block diagrams that stepwise illustrate one example of the movement of data in an asymmetric storage volume, consistent with the present disclosure.
Figure 3B:
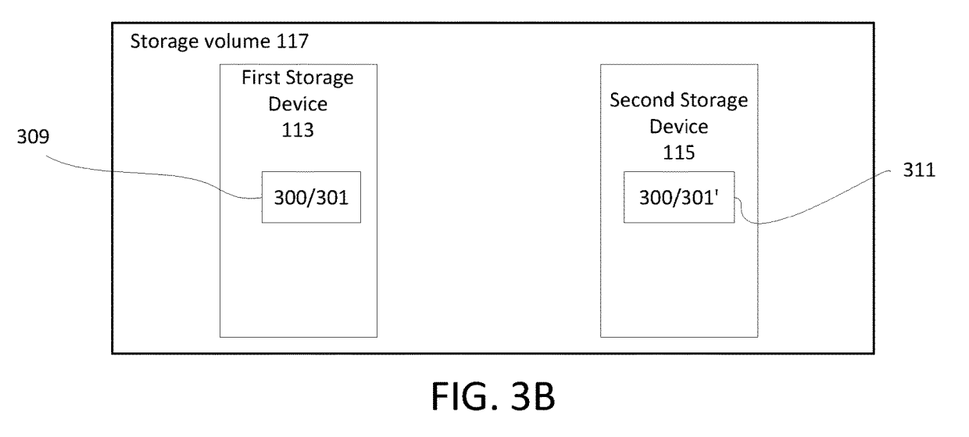

As shown in FIG. 3A, during normal operation a data write command may target ASV 117 for the storage of data 300 thereon. In response to the data write command, data 300 is written to ASV 117 in accordance with its volume configuration. For example when ASV 117 is configured to implement data striping (e.g., RAID 0 or another striping configuration), a portion of data 300 may be written to first storage device 113, and another portion of data 300 may be written to second storage device 115. That concept is illustration in FIG. 3B, which depicts a first portion 301 of data 300 being stored to region 309 of first storage device 113, and a second portion 301' of data 300 being stored to a region 311 of second storage device 115. Alternatively when ASV 117 is configured to implement data mirroring (e.g., RAID 1 or another mirroring configuration), a complete copy of data 300 is written to both the first storage device 113 and the second storage device 115. That concept is also shown in FIG. 3B, which illustrates a complete copy of data 300 resident in the first and second storage devices 113, 115. Still further, the ASV 117 may be in a concatenated or caching configuration (not shown), in which case data writes targeting ASV 117 may result in data being written only to a first storage device, only to a second storage device, or to both the first and second storage device. In any case because the first storage device supports device-based encryption (e.g., is a self-encrypting drive) and the second storage device does not support encryption, any portion of data 300 stored to the first storage device 113 will be in the form of cipher text, whereas any portion of data 300 stored to the second storage device 115 will be in the form of plain text.

Figure 2:
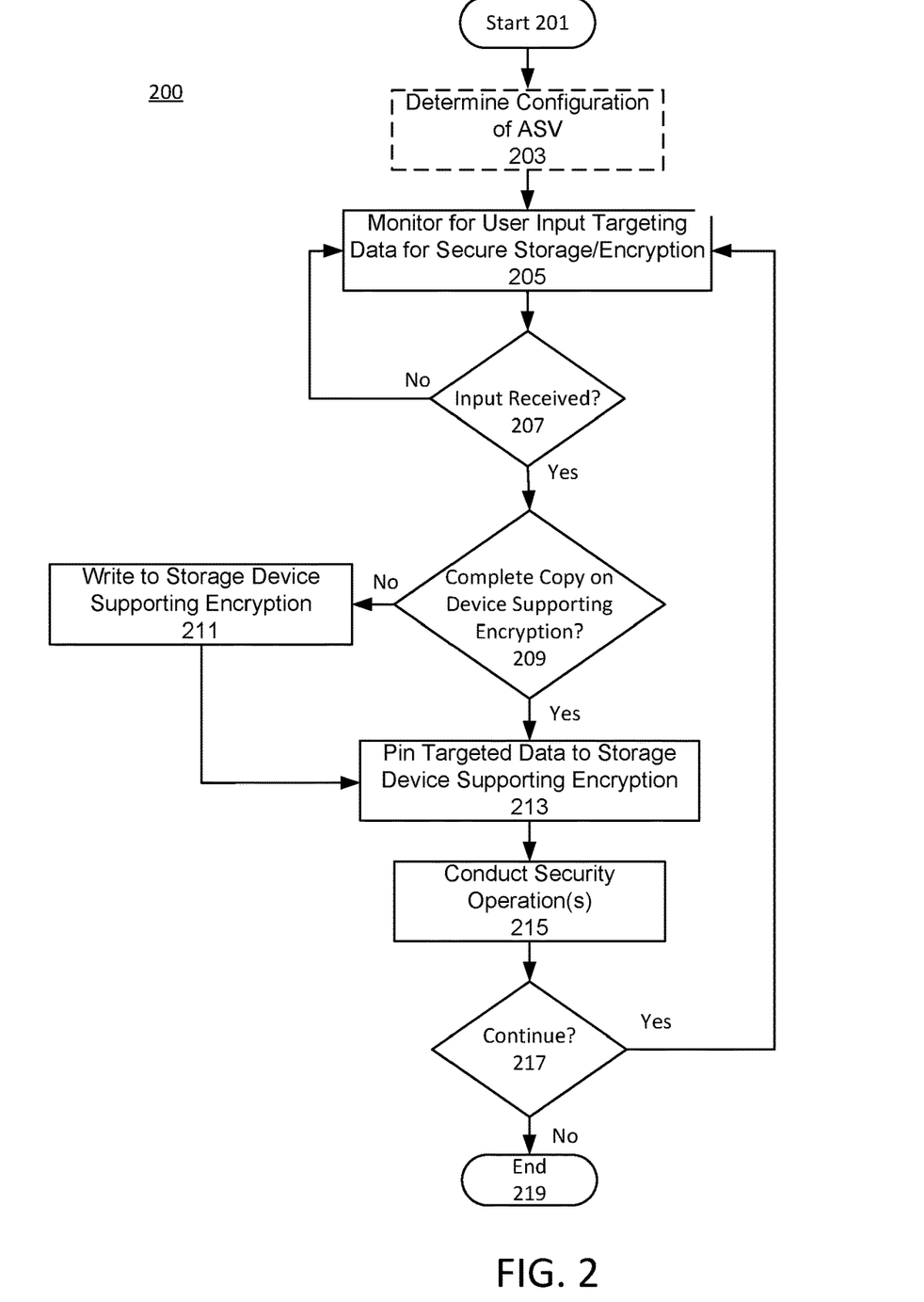
FIG. 2 is a flow diagram illustrating example operations of one example of a method of protecting data in an asymmetric storage volume, consistent with the present disclosure.

Turning now to FIG. 2, as shown the method 200 begins at block 201. The method may then proceed to optional block 203, pursuant to which a SCM (or other component) may optionally determine the configuration of an asymmetric storage volume. For example and as described above, an SCM may be configured to query ASV 117 or other components of a system 100 to determine the configuration of ASV 117. More specifically, pursuant to optional block 203, operations may be conducted to determine how an ASM is configured to store data during normal operation (e.g., with data striping, mirroring, caching, etc.). Operations pursuant to block 203 may also include determining which logical block addresses of the ASV are associated with a storage device that supports device-based encryption (e.g., storage device 113), and which logical block addresses of the ASV are associated with a storage device that does not support device-based encryption (e.g., storage device 115). Alternatively, the operations of block 203 may be omitted when the configuration of an ASV is already known by an SCM or other component.

Once the configuration of the ASV is known (or if the operations of block 203 are not needed), the method may proceed to block 205. Pursuant to block 205 operations may be conducted (e.g., by a SCM or other component) to monitor for a user input that targets data stored on an ASM and identifies it for encryption.

The method may then proceed to block 207, pursuant to which a determination may be made as to whether a user input identifying targeted data for encryption has been received. If not, the method may loop back to block 205 and iterate. When it is determined that such a user input has been received, however, the method may proceed to block 209.

Pursuant to block 209 a determination may be made as to whether a complete copy of the targeted data is present on a storage device that supports device-based encryption. The operations and outcome of block 209 may depend on the configuration of the ASV, a determined location of the targeted data, etc. as discussed above in connection with system 100. For example when the ASV is configured to implement data striping (with or without mirroring), at least a portion of the targeted data will be present on at least one storage device in the ASV (e.g., storage device 115) that does not support encryption, and will not be mirrored on a storage device that support encryption. That concept is shown in FIG. 3B, where a first portion 301' of data 300 is stored to first storage device 113, and a second (and different) portion 301' of data 300 is stored to second storage device 115. In such instance, the outcome of block 213 is yes, and the method may proceed to block 215. In contrast where the ASV is configured to implement data mirroring (with or without striping), a complete copy of the targeted data will be present on all storage devices in the ASV. That concept is shown in FIG. 3B, where a complete copy of data 300 is shown as being stored to both first storage device 113 and second storage device 115. In instances where the ASV is a concatenation of first and second storage device 113 and 115, and/or first storage device 113 is configured to cache second storage device 115, the outcome of block 209 may depend on operations (e.g., by an SCM) that determine where the targeted data is presently stored in the ASV.

Figure 3C:
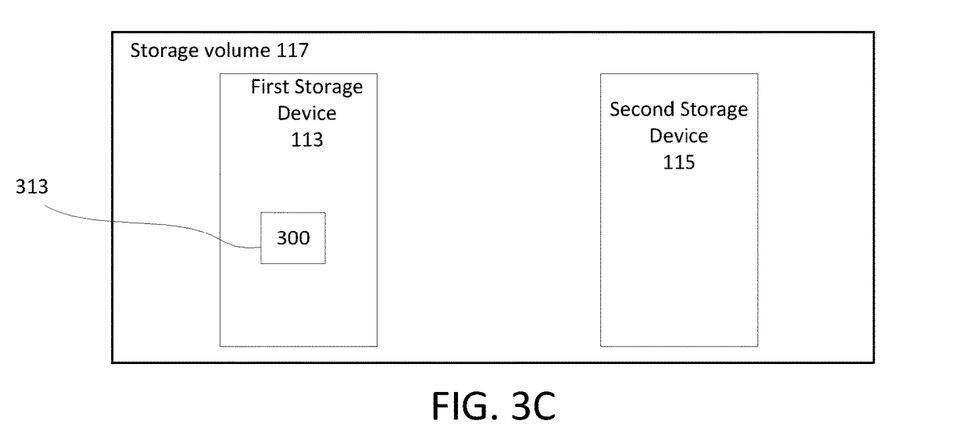

When a complete copy of the targeted data is present on a device supporting encryption (e.g., first storage device 113), the outcome of block 209 is YES and the method may advance to block 213. But if not, the outcome of block 209 is NO, and the method may proceed to block 211. Pursuant to block 211, operations may be conducted to relocate any portion of the targeted data from a storage device that does not support device-based encryption to a device that does support device-based encryption. As shown in FIGS. 3B and 3C, for example, operations may be conducted to move the second portion 301' of data 300 to the first storage device 113, resulting in a complete copy of data 300 on the first storage device 115. Once a complete copy of the targeted data is stored on a device supporting encryption (e.g., first storage device 113), the method may advance from block 211 to block 213. Similar operations may be conducted where the ASV in FIGS. 3A-3C is in the form of a concatenation of first and second storage devices, and/or where the ASV is configured such that the first storage device is a cache for the second storage device.

Pursuant to block 213, operations may be performed to pin the targeted data to a storage device that supports encryption (e.g., first storage device 113). For example and consistent with the discussion of system 100, such pinning operations may include setting a pin flag in a file system or other data structure (e.g., a logical to physical table) that maps a logical representation of data on a storage device to physical locations on the first storage device/ASV. As discussed above, a set pin flag may prevent relocation of targeted data off of a storage device supporting encryption until the pin flag is released. In embodiments, a set pin flag may permit or prevent movement of the targeted data within a storage device supporting encryption.

Following the operations of block 213 the method may advance to block 215, pursuant to which one or more security operations may be performed. Consistent with the foregoing discussion, the security operations may function to obfuscate and/or erase targeted data from one or more storage locations. In embodiments, operations pursuant to block 215 may include obfuscating any portion of the targeted data on a storage device that does not support device-based encryption (e.g., second storage device 115). Such operations may include, for example, updating the file system or one or more data structures (e.g., a logical to physical table) to change the logical block addresses that are associated with the targeted data on the second storage device, as discussed above in connection with system 100.

Alternatively or additionally, the operations pursuant to block 215 may include erasing the portion of the targeted data on a storage device that does not support device-based encryption (e.g., second storage device 115). Such operations may include, for example, executing or causing the execution of a trim command that erases the logical block addresses of the second storage device 115 that are associated with the targeted data. The trim command may, for example, indicate to the second storage device 115 that the pages/LBAs containing targeted data are no longer in use—thus allowing those pages/LBAs to be overwritten by the second storage device. To improve security or for other purposes, the security operations may also include causing the second storage device 115 to overwrite the pages/LBAs that contain(ed) targeted data with other data. For example, in some embodiments SCM 109 may, concurrent with or after execution of a trim command, execute or cause the issuance of an overwrite command that causes the second storage device 115 to overwrite the pages/LBAs of the second storage device that contain(ed) targeted data with zeros or other data. Alternatively where trim is not supported by the relevant storage device, overwriting operations may be performed without the execution of a trim command.

Following the operations of block 215 the method may proceed to block 221, pursuant to which a determination may be made as to whether the method is to continue. If so, the method may loop back to block 205 and iterate. But if not, the method may proceed to block 223 and end.

Another aspect of the present disclosure relates to a computer readable storage medium that contains computer readable instructions which when executed by a processor cause the processor (or a device containing the processor) to perform data protection operations consistent with the present disclosure. Such data protection operations may be or include, for example, the operations described above in connection with FIGS. 1 and 2. When used the computer readable storage medium may be in the form of an article of manufacture. In some examples, the computer readable storage medium may be a non-transitory computer readable medium or machine readable storage medium, such as but not limited to an optical, magnetic or semiconductor storage medium. In any case the storage medium may store various types of computer executable instructions, such as instructions to the operations of the method of FIG. 2. Non-limiting examples of suitable computer readable storage media that may be used include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

As will be appreciated the technologies of the present disclosure may enable the protection of data in an asymmetric volume by enabling targeted data that is identified by a user input to be store only on one or more data storage devices in the asymmetric volume that natively support encryption, such as one or more self-encrypting drives. Although the technologies may limit or forgo some or all of the benefits of the use of an array of multiple storage devices in favor of security, that tradeoff may desired in instances where security is favored over performance and/or redundancy.

EXAMPLES

The following examples pertain to further embodiments consistent with the present disclosure:

Example 1

According to this example there is provided a system for protecting data, including: a processor; a memory; a storage control module (SCM); and an asymmetric volume (ASV) including at least one first storage device arrayed with a second storage device into a single logical volume; wherein: the first storage device supports device-based encryption; the second storage device does not support device-based encryption; the SCM is configured, in response to a user input identifying targeted data stored on the ASV for encryption, to cause the performance of the following operations including: when a complete copy of the targeted data is not stored on the first storage device, causing at least a portion of the targeted data stored on the second storage device to be rewritten to the first storage device such that a complete copy of the targeted data is stored in the first storage device; and when a complete copy of the targeted data is stored on the first storage device, causing the performance of at least one security operation to obfuscate or erase any portion of the targeted data from the second storage device.

Example 2

This example includes any or all of the features of example 1, wherein the first storage device is a self-encrypting drive.

Example 3

This example includes any or all of the features of any one of examples 1 and 2, wherein the first storage device is configured to store data thereon as cipher text, and the second storage device is configured to store data thereon as plain text.

Example 4

This example includes any or all of the features of any one of examples 1 to 3, wherein the ASV is configured to implement data striping.

Example 5

This example includes any or all of the features of any one of examples 1 to 3, wherein the ASV is configured to implement data mirroring.

Example 6

This example includes any or all of the features of any one of examples 1 to 3, wherein the ASV is configured such that the first storage device caches the second storage device.

Example 7

This example includes any or all of the features of any one of examples 1 to 3, wherein ASV is configured such that the first and second storage devices are concatenated.

Example 8

This example includes any or all of the features of any one of examples 1 to 8, wherein SCM is further configured to cause the complete copy of the targeted data to be pinned the first storage device.

Example 9

This example includes any or all of the features of example 8, wherein the SCM is configured to cause the complete copy of the targeted data to be pinned to the first storage device at least in part by setting a pin flag in a file system or in a logical to physical table.

Example 10

This example includes any or all of the features of any one of examples 1 to 3, wherein: the ASV includes a first logical block address (LBA) range spanning at least the first and second storage devices; the SCM is further configured to: determine a first subset of the first LBA range that is associated with the first storage device and a second subset of the first LBA range that is associated with the second storage device; and when a complete copy of the targeted data is not stored on the first storage device, rewriting at least a portion of the targeted data from the second subset to logical block addresses within the first subset.

Example 11

This example includes any or all of the features of any one of examples 1 to 10, wherein the SCM is further configured to expose the first storage device's device-based encryption support to a user of the system.

Example 12

This example includes any or all of the features of any one of examples 1 to 11, wherein at least one of the first and second storage devices is a solid state disk.

Example 13

This example includes any or all of the features of any one of examples 1 to 12, wherein the at least one security operation includes causing the execution of a trim command on any portion of the targeted data stored on the second storage device.

Example 14

This example includes any or all of the features of any one of examples 1 to 13, wherein the at least one security operation includes causing the ASV to overwrite logical block addresses associated with any portion of the targeted data stored on the second storage device.

Example 15

This example includes any or all of the features of any one of examples 1 to 14, wherein the at least one security operation is includes causing an update to a file system or one or more data structures, wherein the update changes first logical block addresses that are associated with targeted data stored on the second storage device to second logical block addresses, the second logical block addresses associated with data other than the targeted data.

Example 16

According to this example there is provided a method for protecting data in an asymmetric volume (ASV) including at least one first storage device arrayed with a second storage device into a single logical volume, the method including: in response to a user input identifying targeted data stored on the ASV for encryption: rewriting, when a complete copy of the targeted data is not stored on the first storage device, at least a portion of the targeted data that is stored on the second storage device to the first storage device, such that a complete copy of the targeted data is stored in the first storage device; and executing, when a complete copy of the targeted data is stored on the first storage device, at least one security operation to obfuscate or erase any portion of the targeted data from the second storage device; wherein the first storage device supports device-based encryption, and the second storage device does not support device-based encryption.

Example 17

This example includes any or all of the features of example 16, wherein the first storage device is a self-encrypting drive.

Example 18

This example includes any or all of the features of any one of examples 16 and 17, wherein the first storage device is configured to store data thereon as cipher text and the second storage device is configured to store data thereon as plain text.

Example 19

This example includes any or all of the features of any one of examples 16-18, wherein the ASV is configured to implement data striping.

Example 20

This example includes any or all of the features of any one of examples 16-18, wherein the ASV is configured to implement data mirroring.

Example 21

This example includes any or all of the features of any one of examples 16-18, wherein the ASV is configured such that the first storage device caches the second storage device.

Example 22

This example includes any or all of the features of any one of examples 16-18, wherein ASV is configured such that the first and second storage devices are concatenated.

Example 23

This example includes any or all of the features of any one of examples 16-22, further including pinning the complete copy of the targeted data to the first storage device.

Example 24

This example includes any or all of the features of example 23, wherein the pinning includes setting a pin flag in a file system or in a logical to physical table.

Example 25

This example includes any or all of the features of any one of examples 16-18, wherein the ASV includes a first logical block address (LBA) range spanning at least the first and second storage devices, and the method further includes: determining a first subset of the first LBA range that is associated with the first storage device; determining a second subset of the first LBA range that is associate with the second storage device; and when a complete copy of the targeted data is not stored in the first storage device, rewriting at least a portion of the targeted data from the second subset to logical block addresses within the first subset.

Example 26

This example includes any or all of the features of any one of examples 16-25, further including exposing the first storage device's device-based encryption support to a user of the system.

Example 27

This example includes any or all of the features of any one of examples 16-26, wherein at least one of the first and second storage devices is a solid state disk.

Example 28

This example includes any or all of the features of any one of examples 16-27, wherein the at least one security operation includes executing a trim command on any portion of the targeted data stored to the second storage device.

Example 29

This example includes any or all of the features of any one of examples 16-28, wherein the at least one security operation includes overwriting logical block addresses associated with any portion of the targeted data stored on the second storage device.

Example 30

This example includes any or all of the features of any one of examples 16-29, wherein the at least one security operation includes changing first logical block addresses that are associated with targeted data stored to the second storage device to second logical block addresses, the second logical block addresses associated with data other than the targeted data.

Example 31

According to this example there is provided a computer readable storage medium including instructions which when executed by a processor of a system cause the performance of storage control operations including: in response to a user input identifying targeted data stored one an asymmetric volume (ASV) for encryption, the ASV including at least one first storage device arrayed with a second storage device into a single logical volume: rewriting, when a complete copy of the targeted data is not stored on the first storage device, at least a portion of the targeted data that is stored on the second storage device to the first storage device, such that a complete copy of the targeted data is stored in the first storage device; and executing, when a complete copy of the targeted data is stored on the first storage device, at least one security operation to obfuscate or erase any portion of the targeted data from the second storage device; wherein the first storage device support device-based encryption, and the second storage device does not support device-based encryption.

Example 32

This example includes any or all of the features of any one of examples 31, wherein the first storage device is a self-encrypting drive.

Example 33

This example includes any or all of the features of any one of examples 31 and 32, wherein the first storage device is configured to store data thereon as cipher text and the second storage device is configured to store data thereon as plain text.

Example 34

This example includes any or all of the features of any one of examples 31 to 33 wherein the ASV is configured to implement data striping.

Example 35

This example includes any or all of the features of any one of examples 31 to 33, wherein the ASV is configured to implement data mirroring.

Example 36

This example includes any or all of the features of any one of examples 31 to 33, wherein the ASV is configured such that the first storage device caches the second storage device.

Example 37

This example includes any or all of the features of any one of examples 31 to 33, wherein ASV is configured such that the first and second storage devices are concatenated.

Example 38

This example includes any or all of the features of any one of examples 31 to 37, wherein the storage control operations further comprise pinning the complete copy of the targeted data to the first storage device.

Example 39

This example includes any or all of the features of example 38, wherein the pinning includes setting a pin flag in a file system or in a logical to physical table.

Example 40

This example includes any or all of the features of any one of examples 31 to 33, wherein the ASV includes a first logical block address (LBA) range spanning at least the first and second storage devices, and the storage control operations further comprise: determining a first subset of the first LBA range that is associated with the first storage device; determining a second subset of the first LBA range that is associate with the second storage device; and when a complete copy of the targeted data is not stored in the first storage device, rewriting at least a portion of the targeted data from the second subset to logical block addresses within the first subset.

Example 41

This example includes any or all of the features of any one of examples 31 to 40, wherein the storage control operations further comprise exposing the first storage device's device-based encryption support to a user of the system.

Example 42

This example includes any or all of the features of any one of examples 31 to 41, wherein at least one of the first and second storage devices is a solid state disk.

Example 43

This example includes any or all of the features of any one of examples 31 to 42, wherein the at least one security operation includes executing a trim command on any portion of the targeted data stored to the second storage device.

Example 44

This example includes any or all of the features of any one of examples 31 to 43, wherein the at least one security operation includes overwriting logical block addresses associated with any portion of the targeted data stored on the second storage device.

Example 45

This example includes any or all of the features of any one of examples 31 to 44, wherein the at least one security operation includes changing first logical block addresses that are associated with targeted data stored to the second storage device to second logical block addresses, the second logical block addresses associated with data other than the targeted data.

Example 46

According to this example there is provided a system for protecting data in an asymmetric volume, comprising means to perform the operations of the method of any one of examples 16 to 30.

Example 47

According to this example there is provided a computer readable storage medium comprising instructions which when executed by a processor cause the performance of the operations of the method of any one of examples 16 to 30.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A system for protecting data, comprising:
   a processor;
   a memory;
   a storage control module (SCM); and
   an asymmetric volume (ASV) comprising at least one first storage device arrayed with a second storage device into a single logical volume;
   wherein:
   the first storage device supports device-based encryption;
   the second storage device does not support device-based encryption;
   the SCM is configured, in response to a user input identifying targeted data stored on the ASV for encryption, to cause the performance of the following operations comprising:
      when a complete copy of the targeted data is not stored on the first storage device, causing at least a portion of the targeted data stored on the second storage device to be rewritten to the first storage device such that a complete copy of the targeted data is stored in the first storage device; and
      when a complete copy of the targeted data is stored on the first storage device, causing the performance of at least one security operation to obfuscate or erase any portion of the targeted data from the second storage device.

2. The system of claim 1, wherein said first storage device is a self-encrypting drive.

3. The system of any claim 1, wherein SCM is further configured to cause the complete copy of the targeted data to be pinned the first storage device.

4. The system of claim 3, wherein the SCM is configured to cause the complete copy of the targeted data to be pinned to the first storage device at least in part by setting a pin flag in a file system or in a logical to physical table.

5. The system of claim 1, wherein:
the ASV comprises a first logical block address (LBA) range spanning at least the first and second storage devices;
the SCM is further configured to:
determine a first subset of the first LBA range that is associated with the first storage device and a second subset of the first LBA range that is associated with the second storage device; and
when a complete copy of the targeted data is not stored on the first storage device, rewriting at least a portion of the targeted data from the second subset to logical block addresses within the first subset.

6. The system of claim 1, wherein said at least one security operation comprises causing the execution of a trim command on any portion of the targeted data stored on the second storage device.

7. The system of claim 1, wherein said at least one security operation comprises causing the ASV to overwrite logical block addresses associated with any portion of the targeted data stored on the second storage device.

8. A method for protecting data in an asymmetric volume (ASV) comprising at least one first storage device arrayed with a second storage device into a single logical volume, the method comprising:
in response to a user input identifying targeted data stored on the ASV for encrypted storage:
rewriting, when a complete copy of the targeted data is not stored on the first storage device, at least a portion of the targeted data that is stored on the second storage device to the first storage device, such that a complete copy of the targeted data is stored in the first storage device; and
executing, when a complete copy of the targeted data is stored on the first storage device, at least one security operation to obfuscate or erase any portion of the targeted data from the second storage device;
wherein said first storage device supports device-based encryption, and said second storage device does not support device-based encryption.

9. The method of claim 8, wherein said first storage device is a self-encrypting drive.

10. The method of claim 8, further comprising pinning the complete copy of the targeted data to the first storage device.

11. The method of claim 10, wherein said pinning comprises setting a pin flag in a file system or in a logical to physical table.

12. The method of claim 8, wherein the ASV comprises a first logical block address (LBA) range spanning at least the first and second storage devices, and the method further comprises:
determining a first subset of the first LBA range that is associated with the first storage device;
determining a second subset of the first LBA range that is associate with the second storage device; and
when a complete copy of the targeted data is not stored in the first storage device, rewriting at least a portion of the targeted data from the second subset to logical block addresses within the first subset.

13. The method of claim 8, wherein at least one of the first and second storage devices is a solid state disk.

14. The method of claim 8, wherein said at least one security operation comprises executing a trim command on any portion of the targeted data stored to the second storage device.

15. The method of claim 8, wherein said at least one security operation comprises overwriting logical block addresses associated with any portion of the targeted data stored on the second storage device.

16. The method of claim 8, wherein said at least one security operation comprises changing first logical block addresses that are associated with targeted data stored to said second storage device to second logical block addresses, said second logical block addresses associated with data other than said targeted data.

17. A computer readable storage medium comprising instructions which when executed by a processor of a system cause the performance of storage control operations comprising:
in response to a user input identifying targeted data stored one an asymmetric volume (ASV) for encrypted storage, the ASV comprising at least one first storage device arrayed with a second storage device into a single logical volume:
rewriting, when a complete copy of the targeted data is not stored on the first storage device, at least a portion of the targeted data that is stored on the second storage device to the first storage device, such that a complete copy of the targeted data is stored in the first storage device; and
executing, when a complete copy of the targeted data is stored on the first storage device, at least one security operation to obfuscate or erase any portion of the targeted data from the second storage device;
wherein said first storage device support device-based encryption, and said second storage device does not support device-based encryption.

18. The computer readable storage medium of claim 17, wherein said first storage device is a self-encrypting drive.

19. The computer readable storage medium of claim 17, wherein said storage control operations further comprise pinning the complete copy of the targeted data to the first storage device.

20. The computer readable storage medium of claim 19, wherein said pinning comprises setting a pin flag in a file system or in a logical to physical table.

21. The computer readable storage medium of claim 17, wherein the ASV comprises a first logical block address (LBA) range spanning at least the first and second storage devices, and said storage control operations further comprise:
determining a first subset of the first LBA range that is associated with the first storage device;
determining a second subset of the first LBA range that is associate with the second storage device; and
when a complete copy of the targeted data is not stored in the first storage device, rewriting at least a portion of the targeted data from the second subset to logical block addresses within the first subset.

22. The computer readable storage medium of claim 17, wherein said storage control operations further comprise exposing the first storage device's device-based encryption support to a user of the system.

23. The computer readable storage medium of claim 17, wherein at least one of the first and second storage devices is a solid state disk.

24. The computer readable storage medium of claim 17, wherein said at least one security operation comprises executing a trim command on any portion of the targeted data stored to the second storage device.

25. The computer readable storage medium of claim 17, wherein said at least one security operation comprises overwriting logical block addresses associated with any portion of the targeted data stored on the second storage device.

26. The system of claim 1, wherein at least one of the first and second storage devices is a solid state disk.

* * * * *